US009056560B2

(12) United States Patent
Perrin

(10) Patent No.: US 9,056,560 B2
(45) Date of Patent: Jun. 16, 2015

(54) SEAT ASSEMBLY HAVING A FRONT CUSHION MODULE

(75) Inventor: Philippe Perrin, Rosenheim (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/983,963

(22) PCT Filed: Mar. 20, 2012

(86) PCT No.: PCT/US2012/029757
§ 371 (c)(1),
(2), (4) Date: Aug. 6, 2013

(87) PCT Pub. No.: WO2012/138472
PCT Pub. Date: Oct. 11, 2012

(65) Prior Publication Data
US 2013/0313876 A1 Nov. 28, 2013

Related U.S. Application Data

(60) Provisional application No. 61/472,780, filed on Apr. 7, 2011.

(51) Int. Cl.
A47C 7/02 (2006.01)
B60N 2/06 (2006.01)
B60N 2/24 (2006.01)
B60N 2/62 (2006.01)
B60N 2/68 (2006.01)
B60N 2/70 (2006.01)
B60N 2/72 (2006.01)
B60N 2/16 (2006.01)
B60N 2/20 (2006.01)
B60N 2/58 (2006.01)

(52) U.S. Cl.
CPC .. *B60N 2/06* (2013.01); *B60N 2/24* (2013.01); *B60N 2/62* (2013.01); *B60N 2/68* (2013.01); *B60N 2/7094* (2013.01); *B60N 2/72* (2013.01); *B60N 2/16* (2013.01); *B60N 2/20* (2013.01); *B60N 2/5825* (2013.01)

(58) Field of Classification Search
CPC .............. B60N 2/06; B60N 2/62; B60N 2/68; B60N 2/70; B60N 2/72; B60N 2/5825
USPC ............... 297/284.3, 284.11, 452.48, 452.49, 297/452.52
See application file for complete search history.

(56) References Cited

U.S. PATENT DOCUMENTS

| 4,664,444 | A | * | 5/1987 | Murphy | 297/284.11 |
| 4,682,763 | A | * | 7/1987 | Kazaoka et al. | 267/89 |
| 6,042,190 | A | * | 3/2000 | Mathe et al. | 297/483 |
| 7,287,305 | B2 | * | 10/2007 | Bednarski | 24/297 |
| 7,597,398 | B2 | * | 10/2009 | Lindsay | 297/284.11 |
| 2004/0075312 | A1 | * | 4/2004 | Neale | 297/216.12 |

(Continued)

OTHER PUBLICATIONS

International Searching Authority, International Search Report and the Written Opinion for the corresponding PCT Application PCT/US2012/29757 mailed Jul. 9, 2012.

*Primary Examiner* — Philip Gabler
(74) *Attorney, Agent, or Firm* — Brooks Kushman P.C.

(57) ABSTRACT

A vehicle seat assembly having a seat bottom that includes first and second side frame members and a front cushion module. The front cushion module has a support wire and a cushion. The support wire has first and second ends that are disposed proximate the front end of the first and second side frame members, respectively. The cushion receives and is supported by the support wire.

20 Claims, 2 Drawing Sheets

(56) References Cited

U.S. PATENT DOCUMENTS

| | | | |
|---|---|---|---|
| 2004/0084937 A1 * | 5/2004 | Berta | ................. 297/180.14 |
| 2006/0049682 A1 | 3/2006 | Yamanaka | |
| 2007/0257531 A1 | 11/2007 | Mashimo | |
| 2008/0001425 A1 | 1/2008 | Castro | |

* cited by examiner

SEAT ASSEMBLY HAVING A FRONT CUSHION MODULE

CROSS-REFERENCE TO RELATED APPLICATIONS

This application is a U.S. national phase of PCT Application No. PCT/US2012/029757, filed Mar. 20, 2012, which claims the benefit of U.S. Provisional Application No. 61/472,780, filed Apr. 7, 2011, the disclosures of which are hereby incorporated by reference in their entirety.

TECHNICAL FIELD

The present application relates to a seat assembly having a front cushion module.

BACKGROUND

A vehicle seat having a thigh support is disclosed in U.S. Pat. No. 4,629,248.

SUMMARY

In at least one embodiment, a vehicle seat assembly is provided. The vehicle seat assembly may include a seat back that is pivotally disposed on a seat bottom. The seat bottom may have first and second side frame members and a front cushion module. The first and second side frame members may each have a rear end disposed proximate the seat back and a front end disposed opposite the rear end. The front cushion module may have a support wire and a cushion. The support wire may have first and second ends that may be disposed proximate the front end of the first and second side frame members, respectively. The cushion may receive and may be supported by the support wire.

In at least one embodiment, a vehicle seat assembly is provided. The vehicle seat assembly may include a seat back that is pivotally disposed on a seat bottom. The seat bottom may have first and second side frame members and a front cushion module. The first and second side frame members may be disposed along opposite sides of the seat bottom and may each have a rear end disposed proximate the seat back and a front end disposed opposite the rear end. The front cushion module may have a support wire, a cushion, and a cross member. The support wire may have first and second ends disposed proximate the front end of the first and second side frame members, respectively. The cushion may receive and may be supported by the support wire. The cross member may be disposed in the cushion and may be fixedly disposed on the first and second side frame members.

In at least one embodiment, a vehicle seat assembly is provided. The vehicle seat assembly may include a seat back, a seat bottom, and a trim cover. The seat bottom may have a seat bottom frame, a seat height adjuster, and a front cushion module. The seat bottom frame may have first and second side frame members and a frame cross member that extends between the first and second side frame members. The seat height adjuster may have first and second rear linkages and first and second front linkages. The first and second rear linkages may be pivotally disposed on the frame cross member. The first and second front linkages may be pivotally disposed on the first and second side frame members, respectively. The front cushion module may have a support wire and a cushion. The support wire may have first and second ends that may engage the front end of the first and second side frame members, respectively. The cushion may have a front surface and a set of notches that extend from the front surface. The support wire may extend through each member of the set of notches and may support the cushion. The trim cover may have a set of attachment features that engage the support wire to couple the trim cover to the seat bottom.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
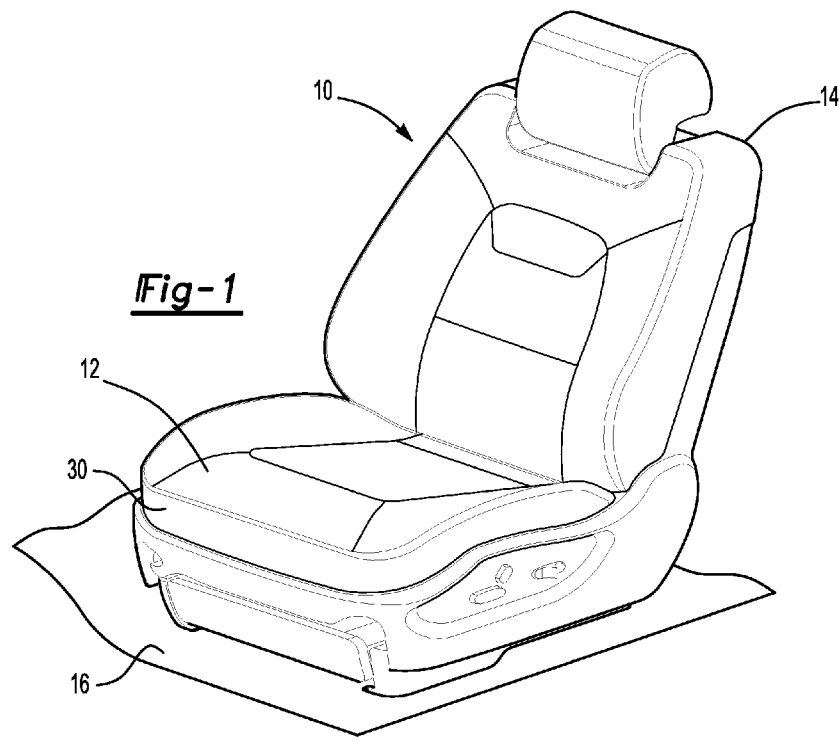
FIG. 1 is a perspective view of an exemplary seat assembly.

Referring to FIG. 1, an exemplary seat assembly 10 is shown. The seat assembly 10 may be configured for use in a vehicle, such as motor vehicle like a car or truck. The seat assembly 10 may include a seat bottom 12 and a seat back 14 that may be pivotally disposed on the seat bottom 12. The seat bottom 12 may be mounted to a surface 16, such as a vehicle floor.

Figure 2:
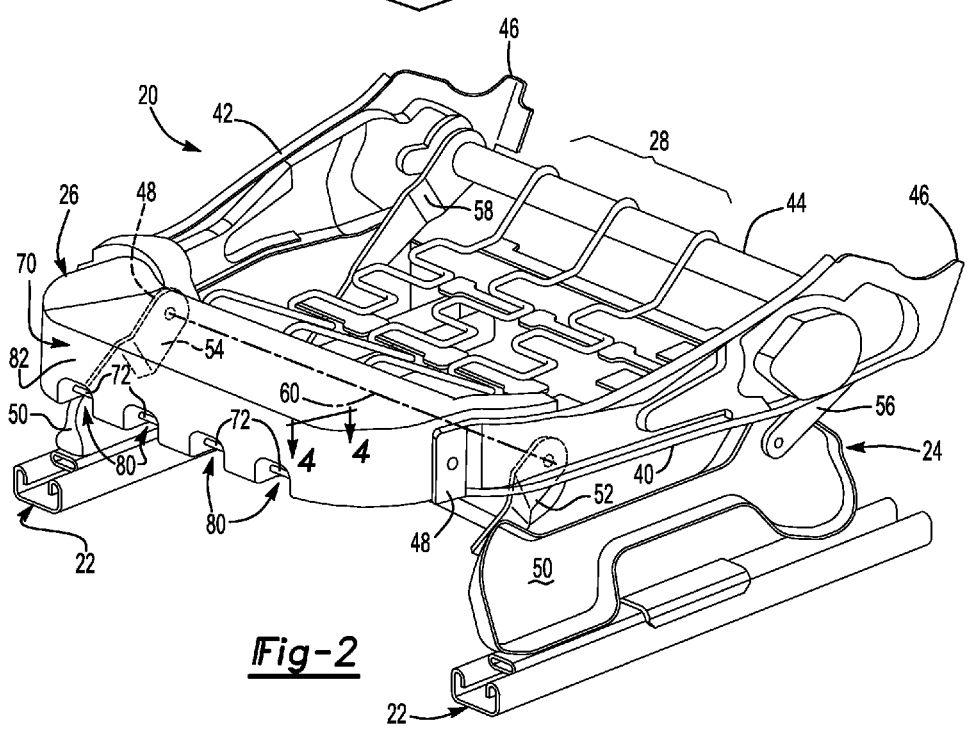
FIG. 2 is a perspective view of a portion of a seat bottom of the seat assembly having a front cushion module.
Figure 3:
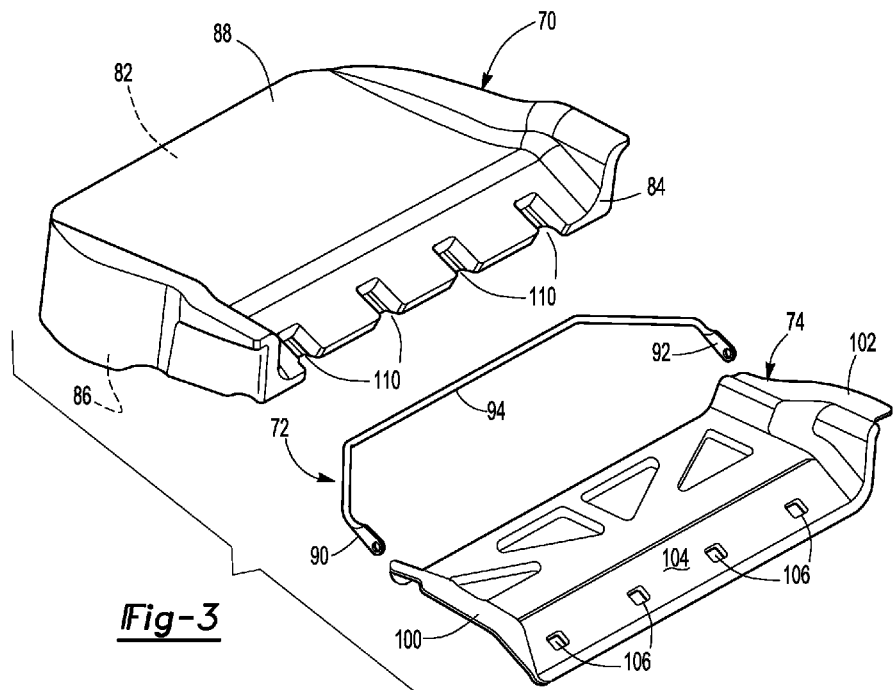
FIG. 3 is an exploded view of an exemplary embodiment of a front cushion module.
Figure 4:
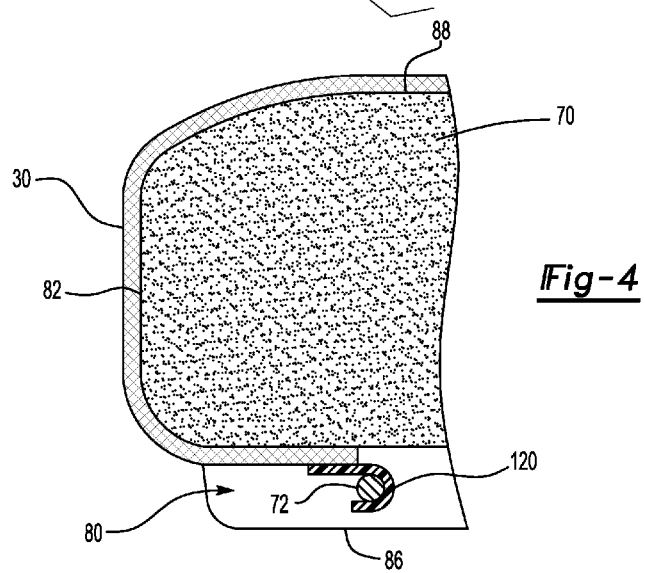
FIG. 4 is a section view of the seat bottom along section line 4-4 in FIG. 1 with the addition of a trim cover assembly to illustrate installation of a trim cover assembly on the front cushion module.

Referring to FIGS. 1 and 2, the seat bottom 12 may include a seat bottom frame 20, at least one track assembly 22, a seat height adjuster 24, a front cushion module 26, a suspension mat 28, and a trim cover assembly 30.

The seat bottom frame 20 may provide a load bearing structure for the seat bottom 12. In at least one embodiment, the seat bottom frame 20 may include a first side frame member 40, a second side frame member 42, and a frame cross member 44.

The first and second side frame members 40, 42 may be spaced apart from each other and may extend generally parallel to each other along opposing lateral sides of the seat bottom 12. The first and second side frame members 40, 42 may each include a rear end 46 that may be disposed proximate the seat back 14 and a front end 48 that may be disposed opposite the rear end 46. The front end 48 may be disposed adjacent to the front cushion module 26 as will be discussed in more detail below. The frame cross member 44 may be fixed to and extend from the first side frame member 40 to the second side frame member 42. In the embodiment shown, the frame cross member 44 is disposed proximate the rear end 46 of the first and second side frame members 40, 42 and may be generally located under the seat back 14.

At least one track assembly 22 may be provided to facilitate movement of the seat assembly 10 relative to the mounting surface 16. In the embodiment shown in FIG. 2, two track assemblies 22 are provided. The track assemblies 22 may be fixedly disposed on the mounting surface 16. One track assembly 22 may be generally disposed under the first side frame member 40 and another track assembly 22 may be generally disposed under the second side frame member 42. The track assemblies 22 may be configured to facilitate movement of the seat bottom 12 in a fore/aft direction, or in a forward direction and a rearward direction. The forward and rearward directions are represented by the double arrowed line in FIG. 2, in which the forward direction arrow points toward the left and the rearward direction arrow points toward the right.

A seat height adjuster 24 may be provided to facilitate movement of the seat bottom 12 in one or more directions with respect to a track assembly 22. For instance, the seat height adjuster 24 may permit the seat bottom 12 to move in a vertical direction (up/down) and/or tilt the seat bottom 12 toward or away from the mounting surface 16. The seat height adjuster 24 may be manually actuated or may be power actuated. In a power actuated embodiment, one or more actuators, such as a bi-directional electric motor, may be used to actuate at least a portion of the seat assembly 10 in one or more directions.

In at least one embodiment, the seat height adjuster 24 may include one or more mounting brackets 50, a first front linkage 52, a second front linkage 54, a first rear linkage 56, and a second rear linkage 58.

One or more mounting brackets 50 may be fixedly disposed on each track assembly 22. A mounting bracket 50 may be mounted to a top surface of a track assembly 22 and extend generally upward or away from the mounting surface 16.

The first and second front linkages 52, 54 may connect a corresponding mounting bracket 50 to the seat bottom frame 20. The first front linkage 52 may be pivotally coupled at a first end to a mounting bracket 50 and may be pivotally coupled to the first side frame member 40 at a second end that is disposed opposite the first end. Similarly, the second front linkage 54 may be pivotally coupled at a first end to another mounting bracket 50 and may be pivotally coupled to the second side frame member 42 at a second end that is disposed opposite the first end. The second ends of the first and second front linkages 52, 54 may be coaxially disposed along a pivot axis 60.

The first and second rear linkages 56, 58 may also connect a mounting bracket 50 to the seat bottom frame 20. The first rear linkage 56 may be pivotally coupled at a first end to a mounting bracket 50 and may be pivotally coupled to the frame cross member 44 at a second end that is disposed opposite the first end. Similarly, the second rear linkage 58 may be pivotally coupled at a first end to another mounting bracket 50 and may be pivotally coupled to the frame cross member 44 at a second end that is disposed opposite the first end.

The front cushion module 26 may be mounted to the front of the seat bottom frame 20. The front cushion module 26 may be configured to generally support the thigh region of a seat occupant. In addition, the front cushion module 26 may be disposed forwardly of or completely in a forward direction from the first and second front linkages 52, 54 and/or pivot axis 60 in one or more embodiments. The front cushion module 26 may be provided in various embodiments. For example, the front cushion module 26 may include a cushion 70, a support wire 72, and optionally a cross member 74.

The cushion 70 may be disposed under the trim cover assembly 30 to cushion and support a seat occupant. The cushion 70 may be made of any suitable material, such as expanded polypropylene (EPP) foam. In at least one embodiment, at least a portion of the cushion 70 may extend generally along and above the first and second side frame members 40, 42 to provide localized cushioning.

The cushion 70 may include a set of notches 80. The notches 80 may be spaced apart from each other and may extend substantially parallel to each other in a direction extending from a front surface 82 of the cushion 70 toward a back surface 84 of the cushion 70 that is disposed opposite the front surface 82. Each notch 80 may also extend from a bottom surface 86 of the cushion 70 toward a top surface 88 that is disposed opposite the bottom surface 86. As such, each notch 80 may be open toward and generally accessible from the front and bottom of the front cushion module 26.

The cushion 70 may also be provided with different heights or thicknesses from the bottom surface 86 to the top surface 88 to help provide modular seat designs in which common components of the seat bottom frame 20, track assemblies 22, and/or seat height adjuster 24 are employed in different seat assembly designs, but the configuration of the front cushion module 26 and/or cushion 70 may be modified to provide different seat cushion heights or "H points" for different seat assembly models or vehicle seat models.

The support wire 72 may support the cushion 70. The support wire 72 may have any suitable configuration. For example, the support wire 72 may be configured as a solid member, a hollow tube, or combinations thereof. In addition, the support wire 72 may be provided as a unitary one piece component or may be assembled from multiple components. For instance, the support wire may include one or more tubes, solid portions, and/or brackets that may be assembled together. The support wire 72 may be integrally molded into the cushion 70 or may be inserted into a slot in the cushion 70. In at least one embodiment, the support wire 72 may include a first end portion 90 and a second end portion 92 disposed opposite the first end portion 90. The first and second end portions 90, 92 may be fixedly coupled to the front end 48 of the first and second side frame members 40, 42, respectively. The first and second end portions 90, 92 may be flattened to form an enlarged region that may include a hole for receiving a fastener, such as a rivet, pin, screw, or bolt, which may be used to couple the support wire 72 to the first and second side frame members 40, 42. The support wire 72 may extend in a forward direction from the first and second side frame members 40, 42 and may include a front portion 94 that may be spaced apart from the front surface 82 of the cushion 70. The front portion 94 may extend laterally, or generally in a direction that extends between the left and right sides of the seat assembly 10. The front portion 94 may extend from the cushion 70 and through each member of the set of notches 80 such that the support wire 72 is spaced apart from the cushion 70 within each notch 80. As such, the support wire 72 may be accessible within each notch 80 to facilitate coupling of the trim cover assembly 30 as will be described in more detail below.

The cross member 74, if provided, may also support the cushion 70 and a seat occupant. The cross member 74 may be integrally molded with the cushion 70 or may be provided as a separate component that may receive or may be inserted into the cushion 70. Like the cushion 70, the cross member 74 may also be provided in different configurations to facilitate modular seat designs in which the configuration of the front cushion module 26 is modified to provide different H points and for different seat designs.

The cross member 74 may be spaced apart from the support wire 72. In addition, the cross member 74 may be disposed above the support wire 72 or closer to the top surface 88 of the cushion 70 than the support wire 72. The cross member 74 may extend laterally between the first and second side frame members 40, 42 and may extend in a forward direction from the front ends 48 of the first and second side frame members 40, 42.

The cross member 74 may include a first mounting flange 100 and a second mounting flange 102. The first and second mounting flanges 100, 102 may extend from or through opposite sides of the cushion 70 and may be coupled to the first and second side frame members 40, 42, respectively. In at least one embodiment, the first and second mounting flanges 100, 102 may be disposed on a top surface of the first and second side frame members 40, 42 and may be secured to the first and second side frame members 40, 42 in any suitable manner, such as by welding or with a fastener like a rivet, pin, screw, or bolt.

The cross member 74 may also include an angled portion 104 that may be disposed between and below the first and second mounting flanges 100, 102. The angled portion 104 may extend downward at an angle toward the mounting surface 16 and may include a set of holes 106. Each member of the set of holes 106 may be spaced apart from each other and may be configured to facilitate mounting of the suspension mat 28 as will be discussed in more detail below. In addition, the set of holes 106 may be aligned with a set of suspension mat notches 110 that may be provided with the cushion 70. More specifically, each hole 106 may be aligned with and disposed within a suspension mat notch 110 that may be provided with the cushion 70. The suspension mat notches 110 may be spaced apart from each other and may provide a recess in which a portion of the suspension mat 28 may be disposed.

The suspension mat 28 may be coupled to the seat bottom frame 20 and optionally the front cushion module 26 to help support a seat occupant. The suspension mat 28 may include a plurality of wires that may be located between the first and second side frame members 40, 42 and that may engage the frame cross member 44 at a first end. In an embodiment in which the front cushion module 26 includes a cross member 74, a second end of one or more wires of the suspension mat 28 may engage or be received in a member of the set of holes 106 of the cross member 74. In an embodiment in which the front cushion module 26 does not include a cross member 74, the suspension mat 28 may be spaced apart from the front cushion module 26. For instance, a second end of one or more wires of the suspension mat 28 may engage a component of the seat bottom frame 20, such as another frame cross member that may be disposed near the front ends 48 of the first and second side frame members 40, 42. In addition, in such embodiments, the suspension mat 28 may be spaced apart from and disposed rearward of a back surface of the cushion 70.

The trim cover assembly 30 may be disposed on the seat bottom 12 and may provide an exterior seating surface. The trim cover assembly 30 may include a trim cover that may be made of any suitable material, such as fabric, leather, vinyl, or combinations thereof. The trim cover assembly 30 may also include set of attachment features 120 may facilitate coupling of the trim cover assembly 30 to the front cushion module 26. In at least one embodiment, the attachment features 120 may be configured as clips, hooks, pins, or retention features that may be coupled to the trim cover. The attachment features 120 may be spaced apart from each other and each attachment feature 120 may extend into a corresponding notch 80 in the cushion 70 to engage different regions of the front portion 94 of the support wire 72. Additional attachment features may also be provided with the trim cover assembly 30 to facilitate coupling to other seat components.

In addition to facilitating trim cover installation, suspension mat installation, and seat modularity, the front end module 26 may allow for the reduction of seat frame components and for reduced seat weight. For instance, front profile members that extend around from the side frame members 40, 42 to enclose the cushion 70 may be deleted. In addition, lateral reinforcement tubing that extends from side to side near the front of the seat bottom 12 may be deleted.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
   a seat back pivotally disposed on a seat bottom, the seat bottom including:
      first and second side frame members that each have a rear end disposed proximate the seat back and a front end disposed opposite the rear end; and
      a front cushion module including:
         a support wire having first and second ends fixedly disposed on the front ends of the first and second side frame members, respectively; and
         a cushion that receives and is supported by the support wire, wherein the cushion includes a front surface disposed at a front of the seat bottom, a top surface disposed at a top of the cushion, a bottom surface disposed opposite the top surface, and a set of notches that extends from the front surface and extend from the bottom surface toward the top surface of the cushion such that the members of the set of notches do not extend to the top surface and are spaced apart from each other and wherein the support wire extends through each member of the set of notches; and
      a trim cover assembly that is attached to the support wire within members of the set of notches.

2. The vehicle seat assembly of claim 1 wherein the seat bottom is disposed on a track assembly that facilitates fore-aft positioning of the vehicle seat assembly, and wherein the first and second side frame members are part of a seat height adjuster that facilitates positioning of the seat bottom with respect to the track assembly.

3. The vehicle seat assembly of claim 2 wherein the seat height adjuster further includes first and second front linkages that are pivotally disposed on the first and second side frame members, respectively, along a pivot axis, wherein the front cushion module is completely disposed forwardly of the pivot axis.

4. The vehicle seat assembly of claim 1 wherein the seat bottom further comprises a suspension mat disposed between the first and second side frame members and between the front cushion module and the seat back, wherein the front cushion module is disposed forwardly and spaced apart from the suspension mat.

5. The vehicle seat assembly of claim 1 wherein the cushion further comprises a back surface disposed opposite the front surface and first and second side surfaces that extend from the front surface to the back surface, wherein the back surface is disposed between the first and second side frame members and located forwardly of first and second front linkages that are pivotally disposed on the first and second side frame members, respectively.

6. The vehicle seat assembly of claim 1 wherein each member of the set of notches is disposed substantially parallel to each other.

7. The vehicle seat assembly of claim 1 further comprising a set of attachment features, wherein each member of the set of attachment features engages the support wire within a corresponding member of the set of notches to secure the trim cover assembly to the support wire.

8. A vehicle seat assembly comprising:
a seat back pivotally disposed on a seat bottom, the seat bottom having:
a seat track assembly;
first and second side frame members that are disposed along opposite sides of the seat bottom and pivotally disposed on the seat track assembly, the first and second side frame members each having a rear end disposed proximate the seat back and a front end disposed opposite the rear end; and
a front cushion module including:
a support wire having first and second ends fixedly disposed on the front ends of the first and second side frame members, respectively; and
a cushion that receives and is supported by the support wire, wherein the cushion has a set of notches that extend from a front surface of the cushion toward a back surface of the cushion disposed opposite the front surface and from a bottom surface of a cushion that faces toward the seat track assembly toward a top surface of the cushion that is disposed opposite the bottom surface such that the set of notches do not extend to the top surface or the back surface, wherein the support wire extends through the cushion and through the set of notches such that the support wire is spaced apart from the cushion within each member of the set of notches; and
a cross member disposed in the cushion, wherein the cross member is fixedly disposed on the first and second side frame members.

9. The vehicle seat assembly of claim 8 wherein the cross member is spaced apart from the support wire.

10. The vehicle seat assembly of claim 8 wherein the cross member includes first and second flanges that are disposed along a top surface of the first and second side frame members, respectively.

11. The vehicle seat assembly of claim 10 wherein a first end of the support wire is fixedly mounted to the first side frame member below the first flange.

12. The vehicle seat assembly of claim 8 wherein the seat bottom further comprises a suspension mat disposed between the first and second side frame members, and wherein the cross member further comprises a set of holes that are spaced apart from each other and that each receive the suspension mat.

13. The vehicle seat assembly of claim 12 wherein the cushion further comprises a set of suspension mat notches, wherein each member of the set of suspension mat notches is aligned with and receives a member of the set of holes in the cross member.

14. The vehicle seat assembly of claim 12 wherein the set of holes is disposed below first and second flanges of the cross member that engage a top surface of the first and second side frame members, respectively.

15. A vehicle seat assembly comprising:
a seat back pivotally disposed on a seat bottom, the seat bottom having:
a seat bottom frame that includes:
first and second side frame members that include a rear end disposed proximate the seat back and a front end disposed opposite the rear end; and
a frame cross member that extends between the first and second side frame members; and
a seat height adjuster that includes:
first and second rear linkages that are pivotally disposed on the frame cross member; and
first and second front linkages that are pivotally disposed on the first and second side frame members, respectively, wherein the first and second front linkages are disposed on the first and second side frame members between the front end and the rear end of the first and second side frame members, respectively; and
a front cushion module that includes:
a support wire having first and second ends that engage the front end of the first and second side frame members, respectively; and
a cushion that receives and is supported by the support wire, wherein the cushion includes a front surface and a set of notches that extend from the front surface, wherein the support wire extends through each member of the set of notches; and
a trim cover that includes a set of attachment features that engage the support wire to couple the trim cover to the seat bottom.

16. The vehicle seat assembly of claim 15 and wherein each member of the set of attachment features is coupled to the support wire within a corresponding member of the set of notches.

17. The vehicle seat assembly of claim 15 wherein the cushion further comprises a back surface disposed opposite the front surface and first and second side surfaces that extend from the front surface to the back surface, wherein the back surface is disposed between the first and second side frame members and located forwardly of the first and second front linkages.

18. The vehicle seat assembly of claim 17 wherein the front cushion module includes a cross member that is disposed in the cushion and that extends from the back surface toward the front surface, wherein the cross member is fixedly disposed on the first and second side frame members.

19. The vehicle seat assembly of claim 18 wherein the cross member is disposed above the set of notches.

20. The vehicle seat assembly of claim 15 wherein the cushion is expanded polypropylene (EPP) foam.

* * * * *